W. H. DOANE & G. W. PASSEL.
Sawing-Machines.
No. 146,886.  Patented Jan. 27, 1874.
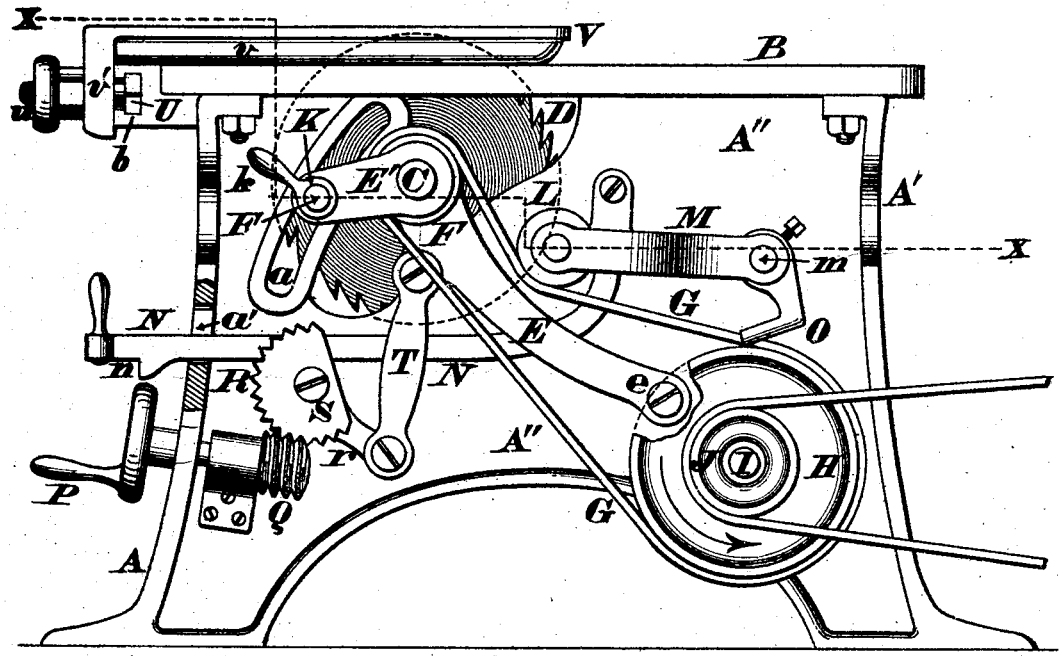
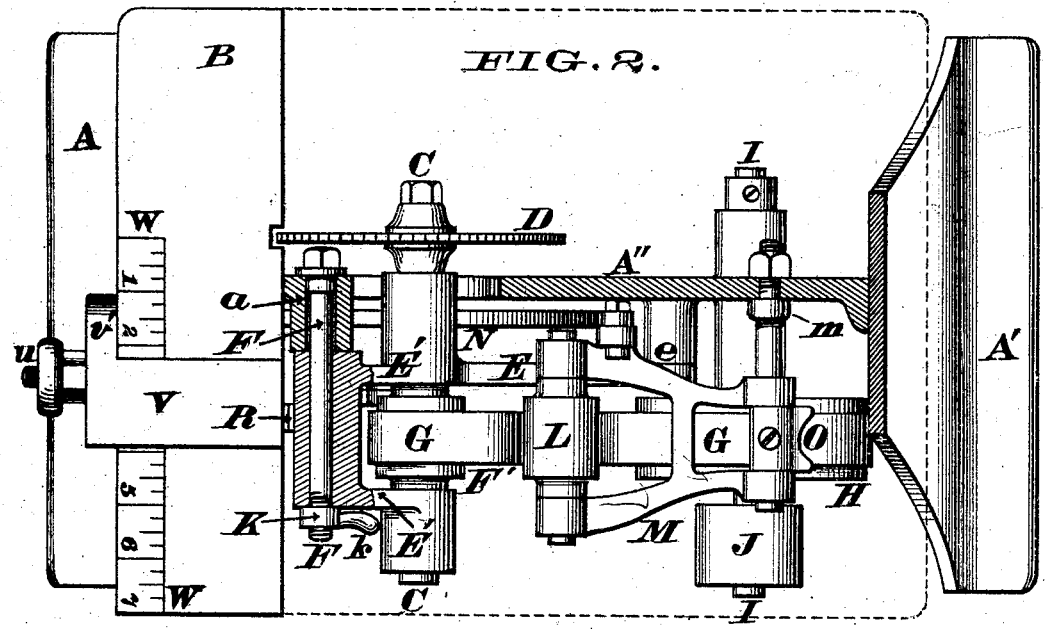
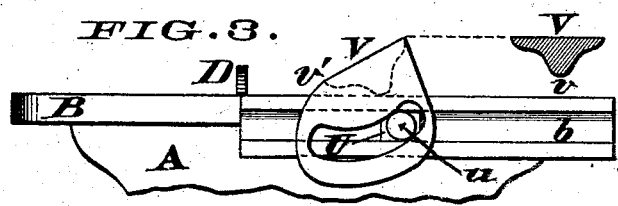

UNITED STATES PATENT OFFICE.

WILLIAM H. DOANE AND GEORGE W. PASSEL, OF CINCINNATI, OHIO, ASSIGNORS TO J. A. FAY & CO., OF SAME PLACE.

IMPROVEMENT IN SAWING-MACHINES.

Specification forming part of Letters Patent No. 146,886, dated January 27, 1874; application filed November 13, 1873.

*To all whom it may concern:*

Be it known that we, WILLIAM HOWARD DOANE and GEORGE W. PASSEL, both of Cincinnati, Hamilton county, Ohio, have invented a new and useful Improvement in Circular Sawing-Machines, of which the following is a specification:

The subject of this invention is an improved form of these machines, in which a circular saw is capable of being elevated or depressed in a suitable bench or table slotted for that purpose, and comprises sundry devices for the easy and effectual stopping and starting of the saw, and for securing its desired protrusion from the table-top for work, or of its complete depression below the same while not needed, thus removing the saw from liability of injurious contact with external objects when out of use, and also making it accessible for replacing an old saw with a new one, or a crosscut for or by a ripping saw; and our invention is particularly directed to means for the easy and secure retention of the saw-frame to any adjustment, to the easy stopping and starting of the saw-mandrel through the instrumentality of an idler, and to an easily-operated angular gage adapted at a single manipulation to any thickness of stuff.

In the accompanying drawings, Figure 1 is a rear elevation of a machine embodying our invention. Fig. 2 is a partially-sectional plan at the line $x\ x$. Fig. 3 is an end view of our adjustable gage.

The operative parts are supported on a base or pedestal, preferably composed of three castings, to wit, two end plates or jambs, A A', securely bolted or riveted to a web, A''. Upon this frame is bolted the table B. The mandrel or arbor C of the saw D is journaled in the free extremity of an arm, E, which is pivoted at $e$ to the web A''. The said arbor has a pulley, F', driven by belt G from pulley H on counter-shaft I, which shaft has a pulley, J, that receives a belt from any driver. The arm E has a prolongation, E', which carries a screw-clamp wrist, F, which traverses a slot, $a$, in the web A'', concentric with the pivot $e$, and is capable of being fixed at any elevation in said slot by means of nut K, having a handle, $k$. The belt G, being loose upon the pulleys, communicates no motion to the saw-arbor, except when pressed by an "idler," L, journaled in arm M, pivoted at $m$ to the web. A rod, N, that extends from arm M through a hole, $a'$, in the jamb A, when drawn forward, as shown in Fig. 1, permits the said idler to rest upon the said belt, and thus enables communication of motion to the arbor; but on being pushed back its tooth or notch $n$ engages on the edge of the hole $a'$, and operates to relieve the said belt from the weight of the said idler. The belt is held in place upon the pulley H by means of a yoke, O. The saw is elevated and depressed by means of a winch, P, outside of jamb A, whose shaft journals in said jamb, and extends through the same, and whose inner extremity carries a worm, Q, which meshes in a segment-rack, R, pivoted on a stud, S, that projects horizontally from the web. From the segment-rack R there projects an arm, $r$, that is connected by a link, T, with the arm E, so that by turning of the winch P to the right or left, the saw is securely held to any adjustment by said worm Q, and the clamp F K acting in co-operation, however severe may be the labor imposed upon the saw. The end of the table B has a dovetailed slot, $b$, for the clamp-jaw U of a gage, V, capable of being adjusted to any desired distance from the saw. The table may be marked with a scale, W, to gage different and specific widths of stuff. The gage V has a convex edge, $v$, beneath, on which it may be rocked. Said gage has also a slotted leg, $v'$, traversed by the clamp-screw $u$. This construction enables the gage to be placed at any angle upon its convex edge $v$ as a center, so as to afford a guide to the sawyer in getting out bevel stuff.

The worm-movement enables the elevation of the saw to be effected with great facility, and serves to hold the same securely to the desired position until more immovably clamped by the wrist and clamp upon the slotted girt or web A''. In like manner, the clamp having been first released, the operator may proceed leisurely to adjust the saw to a less or greater height.

The saw-frame, being firmly clamped to the slotted girt or web at a point intermediate between its center of vibration and the saw-arbor, is held more squarely and firmly in position, and consequently the saw is retained more securely in plane than when the free extremity of the vibrating frame is merely supported without being securely and immovably clamped. In our arrangement the worm-lift and the clamp, in conjunction with the slotted web, coact on the principle of jam-nuts to securely hold the saw-frame.

It will be seen that our idler, in connection with its notched rod or handle, may be employed to stop and start the saw while the counter-shaft is in full rotation.

The peculiar arrangement of the slotted leg V' of gage V and of the clamp-screw U w enables the lower edge to remain in contact with the table-top under any angular adjustment between a vertical line and an angle of forty-five degrees by a single manipulation of the gage.

While preferring to illustrate our invention in a form actually constructed and in successful use by us, we reserve the right to vary the details in non-essential particulars.

We claim herein as new and of our invention—

1. The sawing-machine shown and described, when constructed, arranged, and operating in the manner and for the purposes substantially as specified.

2. The arrangement of adjustable arbor-bearer E with lifting devices P Q R r S T and clamping devices F a K k, for the purpose set forth.

3. The combination of the arbor-bearer E, idler L, arm M, and notched controlling-rod, as set forth.

4. The combination of the slidable and angularly-adjustable gage V v v' and holding-clamp, as and for the purposes specified.

In testimony of which invention we hereunto set our hands.

W. HOWARD DOANE.
GEO. W. PASSEL.

Attest:
   GEO. H. KNIGHT,
   JAMES H. LAYMAN.